(No Model.)

J. M. HEVERLY.
RAILROAD BLOCK SIGNAL.

No. 398,256. Patented Feb. 19, 1889.

Witnesses:
E. P. Ellis,
L. L. Burket.

Inventor:
Jas. M. Heverly,
per F. A. Lehmann,
atty

UNITED STATES PATENT OFFICE.

JAMES MONROE HEVERLY, OF COALPORT, PENNSYLVANIA.

RAILROAD BLOCK-SIGNAL.

SPECIFICATION forming part of Letters Patent No. 398,256, dated February 19, 1889.

Application filed November 22, 1888. Serial No. 291,554. (No model.)

*To all whom it may concern:*

Be it known that I, JAMES MONROE HEVERLY, of Coalport, in the county of Clearfield and State of Pennsylvania, have invented certain new and useful Improvements in Railroad Block-Signals; and I do hereby declare the following to be a full, clear, and exact description of the invention, such as will enable others skilled in the art to which it pertains to make and use it, reference being had to the accompanying drawings, which form part of this specification.

My invention relates to an improvement in railroad block-signals; and it consists in the combination of the revolving colored glasses placed inside of the signal-box and the mechanism for actuating them with endwise-moving toothed slides, which mesh with the wheels which are connected to the mechanism for adjusting the colored lights, and with wheels provided with wrist-pins to which connecting-rods are attached for the purpose of operating the signal-arms, as will be more fully described hereinafter.

The object of my invention is to connect the revolving colored glasses placed inside of the signal-box with the pivoted arms, so that both of them will be operated at the same time.

Figure 1:
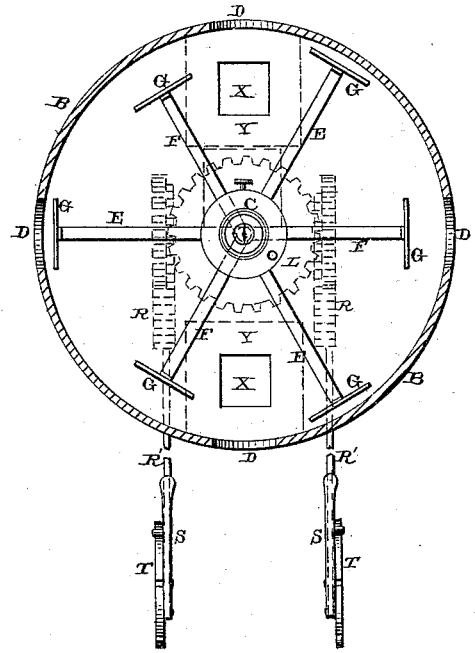
Figure 2:
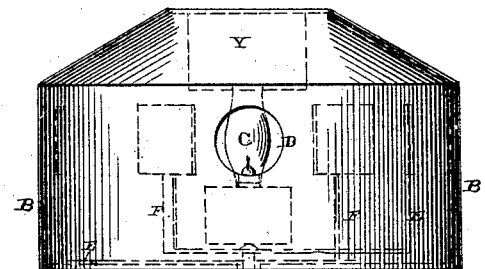
Figure 3:
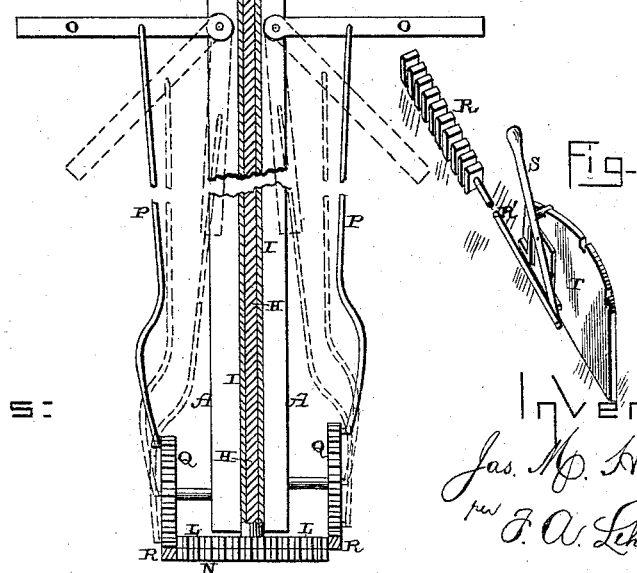

Figure 1 is a plan view of an apparatus which embodies my invention complete. Fig. 2 is a side elevation of the same, shown partly in section. Fig. 3 is a detail view.

A represents the tower, and B the signal-box, which is placed thereon, and which is provided with openings through its side for the light from the lamp C to shine through in the usual manner. These openings D are covered by plain glass. Inside of this box B are placed the two revolving frames E F, which carry the colored glasses G, and which glasses G can be moved in between the opening D and the lamp C, so as to show any desired color to the engineers of the passing trains. The frame E, provided with any suitable number of glasses G, is attached to the vertical shaft H, which is inclosed in the inclosing-sleeve I, and the frame F, provided with any suitable number of glasses G, is attached to the sleeve I, and the sleeve I and shaft H are respectively provided upon their lower ends with the toothed wheels L N. As this shaft H and the sleeve I are to be revolved independently of each other, the glasses G may be revolved either in the same or in opposite directions, as may be desired, so as to bring the desired colors between the lamp C and the openings D in the signal-gox.

Pivoted to the tower A, at any suitable distance above the ground, are the usual signal-arms, O, and connected to these arms are the operating-rods P, which are secured at their lower ends to wrist-pins upon the wheels Q, journaled in any suitable supports at the base of the tower. These wheels Q extend at right angles to the wheels L and N, but are placed at slightly-different elevations. Meshing with the wheel N and the wheel Q is an endwise-moving slide, R, which is provided with teeth upon one of its inner sides and on top, and which slide meshes with the wheel N, secured to the shaft H, and one of the wheels Q. The outer end of this slide is connected to a rod, R', and to this rod R' is attached an operating-lever, S, which is held in any desired position by the segment T, which is provided with three notches, which indicate white, green, and red, or any other colors which may be preferred. Upon the opposite side of the wheels L N is placed a second wheel, Q, and a second slide, R, but which slide meshes with the upper wheel, L, connected to the sleeve I, and the wheel Q, which is also connected with a signal-arm. When the slide upon one side is moved, it moves one frame carrying colored glasses inside of the signal-box and the signal-arm O upon that side of the tower, and when the other slide is moved it moves the other frame carrying colored glasses inside of the signal-box and the other signal-arm upon opposite sides of the tower. By this construction it will be seen that the colored glasses and the signal-arms are connected together, so that when one arm is moved so as to indicate a certain color the corresponding color in the signal-box is changed correspondingly.

In order to enable the signal-arms O to be seen at night by the engineers of the passing trains, and to indicate when the signal-arms are dropped down against the side of the tower, openings X are made through the bottom of the signal-box, so that the light from the lamp C can be reflected through these openings directly upon the arms, and thus show their positions. The great advantage of connecting these arms and the slides together consists in that in case an engineer is color-blind and not able to distinguish the color of the light the position of the signal-arm will indicate to him what the color is. With both the slide and the signal-arm there is little possibility of any mistake being made.

For the purpose of showing the signal-arms at night, reflectors Y are placed inside of the signal-box at an angle above the openings X through the bottom of the box, and these reflectors catch the light and reflect it downward through the openings directly upon the signal-arms, and thus their positions can be seen at night as well as during the day.

No claim is made in this application to the revolving frames containing the glasses, for these are shown in the patent, No. 392,429, granted to me November 6, 1888. In that patent only the revolving frames carrying colored glasses are shown; but no connection is made with the signal-arms. It is necessary that the signal-arms and colored lights should be moved at the same time, as shown in this application.

Having thus described my invention, I claim—

1. The combination of the revolving frames carrying colored glasses placed inside of the signal-box, the operating mechanism connected thereto, wheels provided with wrist-pins, toothed slides which mesh both with the wheels and the operating mechanism of the revolving frames, connecting-rods, the signal-arms, and the levers for operating the slides, substantially as shown.

2. The combination of the signal-box, the revolving frames placed therein and provided with colored glasses, the shaft and the sleeve connected to these revolving frames, wheels connected to the sleeve and shaft, an operating-wheel placed at an angle to the said wheels, a slide which meshes with two of the wheels, a connecting-rod, signal-arms, and a lever for moving the slides, and thus operating both the signal-arms and the colored glasses at the same time, substantially as described.

3. The combination of the tower, the signal-arms pivoted thereto, and a mechanism for operating them, with the signal-box placed upon the top of the tower and provided with openings through its bottom, and reflectors placed in the top of the box, so as to reflect the light of the lamp downward upon the signal-arms, substantially as set forth.

In testimony whereof I affix my signature in presence of two witnesses.

JAMES MONROE HEVERLY.

Witnesses;
- E. P. ELLIS,
- ALLEN S. PATTISON.